United States Patent [19]

Saunders

[11] 3,856,566

[45] Dec. 24, 1974

[54] METHOD OF MAKING INSULATED MAGNET WIRE

[75] Inventor: Hollis S. Saunders, Ballwin, Mo.

[73] Assignee: General Cable Corporation, New York, N.Y.

[22] Filed: Feb. 28, 1973

[21] Appl. No.: 336,781

Related U.S. Application Data

[63] Continuation of Ser. No. 256,440, May 24, 1972, abandoned.

[52] U.S. Cl. .......... 117/218, 117/128.4, 117/161 P, 117/232, 260/37 N
[51] Int. Cl. ............................................ H01b 7/02
[58] Field of Search..... 117/218, 161 P, 232, 128.4; 174/120 SR, 110 N; 260/37 N

[56] References Cited
UNITED STATES PATENTS

| | | | |
|---|---|---|---|
| 3,215,663 | 11/1965 | Weisberg | 260/37 N |
| 3,220,882 | 11/1965 | Lavin et al. | 117/218 |
| 3,321,566 | 5/1967 | Whitman | 260/37 N X |
| 3,324,071 | 6/1967 | Skoog et al. | 260/37 N |
| 3,475,212 | 10/1969 | Bach | 117/218 |
| 3,528,852 | 9/1970 | Olson et al. | 117/218 |
| 3,709,710 | 1/1973 | Edgar et al. | 260/37 N X |

Primary Examiner—Ralph Husack

[57] ABSTRACT

Scrap nylon is used in making the outer coating for magnet wire, but the lowest cost scrap nylon has been that with high amounts of titanium dioxide which gave the wire coating a dull frosty appearance not acceptable to customers. This invention adds considerable additional titanium dioxide to scrap nylon, which instead of causing a dull matte and grainy surface as would be expected, rather causes a slick, smooth surface in the nylon film, not previously found in any nylon surfaces. This slick, smooth surface is felt to be an improvement over the shiny, bright surface previously obtainable.

10 Claims, 2 Drawing Figures

PATENTED DEC 24 1974  3,856,566

METHOD OF MAKING INSULATED MAGNET WIRE

This is a continuation of application Ser. No. 256,440 filed May 24, 1972, now abandoned.

BACKGROUND AND SUMMARY OF THE INVENTION

The magnet wire industry uses extensively a nylon 6,6 polymeric film, applied from a solvent solution, as a topcoat over other polymeric films such as polyvinyl formal, acrylic, polyurethane and polyester.

This nylon topcoat is frequently used to enhance the windability and some other properties of the magnet wire when the wire is used to make electromagnetic coils. The slick, smooth surface obtained with this invention has a low coefficient of friction suitable for winding the wire on high speed winding machines.

Historically, although virgin, freshly manufactured nylon 6,6 polymer can be used to make the wire enamel, usually some type of scrap nylon 6,6 polymer is used for this purpose, because of economics.

Nylon 6,6 polymer scrap is available in three grades or forms, bright, semi-bright, and dull, and from many sources. Titanium dioxide is present at approximately 0.02 percent or 20 ppm in the "bright" nylon, at approximately 0.075 percent or 75 ppm in semi-bright nylon, and at 0.20–0.30 percent or 200–300 ppm in dull nylon.

Usually the bright nylon is the preferred type because it gives a bright clear and shiny surface in the topcoat film. The dull nylon gives a dull frosty appearance to the nylon topcoat film. This surface is not generally acceptable to customers, and for that reason has not been used to a large extent in making nylon wire enamel. There being more demand for the bright grade, it is, of course, more expensive.

Nylon wire enamel is usually applied as a topcoat with other material basecoats in the manufacture of magnet wire products. Nylon wire enamels acquire a dull and frosty surface appearance when used as topcoat films, as the amount of titanium dioxide content compared to the nylon 6,6 polymer content is increased from 0.02 percent to 0.30 percent by use of the different grades of nylon scrap to make up the formula.

It would be expected that larger additions of titanium dioxide would increase the dullness markedly, and actually make the surface grainy in appearance and feel, while making the nylon cured film topcoat opaque and whitish in color.

I have discovered that although larger additions of titanium dioxide do increase dullness up to certain limits, further addition of titanium dioxide produces a synergistic reaction which I have found causes the surface of the cured nylon topcoat film to take on a slickness, and smoothness heretofore not seen with such nylon topcoat films when applied to magnet wire, while also obtaining the expected opacity and whiteness.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DESCRIPTION OF PREFERRED EMBODIMENT

Figure 1:
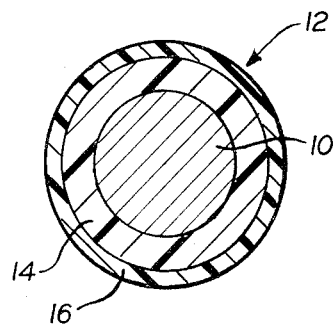
FIG. 1 is a sectional view through a magnet wire insulated in accordance with this invention, the section being taken on the plane 1—1 of FIG. 2.
Figure 2:
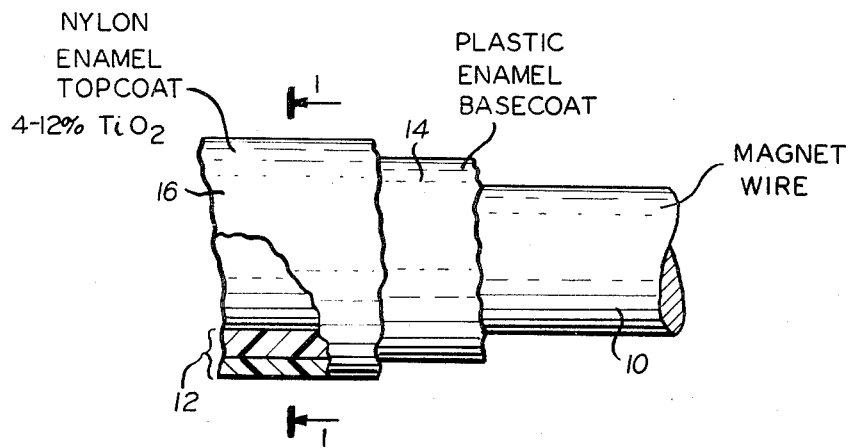
FIG. 2 is a fragmentary side elevation partly broken away and partly in section, of the magnet wire shown in FIG. 1.

FIG. 1 shows a magnet wire including a metal conductor 10, usually copper, or aluminum, surrounded by insulation 12. The insulation includes a plastic basecoat 14 which is preferably a thermo-setting enamel usually a polyvinyl formal, a polyurethane, an acrylic, a polyester, or a polyester polyimide enamel; and a nylon topcoat 16 which is thermoplastic.

The basecoat 14 may be any conventional basecoat as commonly used for magnet wire; and the topcoat is of less thickness than the basecoat, being between about 15 – 35 percent of the total thickness of the insulation 12. Nylon wire enamels have been used as topcoats, as previously explained and scrap nylon has been used for economy; but the scrap nylon has been preferably the bright grade which is the most expensive because of its greater demand. Thus the saving in using scrap nylon has been much less than if the dull nylon scrap could be used or mixtures containing substantial amounts of dull scrap.

In order to obtain the synergistic reaction of this invention, titanium dioxide is added to the nylon enamel so as to bring the titanium dioxide within a range of 18 – 40 percent of the total solids in the enamel, in the preferred embodiment of the invention. This obtains a wire enamel topcoat which provides an opaque film which has a very slick and smooth surface; and the degree of whiteness depends upon how much titanium dioxide has been added to the nylon wire enamel. Other color pigment can be added if a color other than white is desired. It will be understood that all references to percentage in this specification and in the claim refer to percentage by weight.

The titanium dioxide content of the nylon enamel can be from 3 to 100 percent based on the nylon solids content of the enamel. The addition of more titanium dioxide than necessary to produce the synergistic reaction increases the volume of the enamel, but is economical only where titanium dioxide can be obtained at cost lower than that of nylon scrap, or the capacity given by the titanium dioxide reduces the dye costs of other coloring additions.

The addition of titanium dioxide to bring the total titanium dioxide present in the enamel above 3 percent of the nylon present or above 18 percent of the total solids of the enamel forms an opaque film which has a very slick and smooth surface.

Increased film properties of cut-thru resistance, heat aging resistance, and abrasion resistance are to be expected from the titanium dioxide addition, as well as the opaque whiteness. The slick, smooth surface, however, is completely unexpected, since nylon scrap with progressively larger amounts of titanium dioxide in going from the "bright" to the "dull" grade produced a dull surface in contrast to a shiny surface and the change to the slick, smooth surface effect by adding still larger quantities of titanium dioxide is caused by the synergistic reaction which I have discovered.

The solderability of nylon coated solderable magnet wires, such as polyurethanes, acrylics and more recently some esterimides is generally unaffected by the nylon topcoat film. Even though large amounts of titanium dioxide are added to the nylon film the solderability characteristics of those films are not destroyed and are generally only slightly affected if at all, thus continuing the solderability properties of such wires. Where the solderability is affected, the only effect is to require a slightly longer time to effect the soldering.

The titanium dioxide material is dispersed in the wire enamel, not dissolved in it. Nylon wire enamels are made by dissolving nylon filament, generally scrap, in a cold, or hot solvent system made up of cresylic acid, solvesso 100, phenol, and sometimes xylol, and allowing the solution to cool to room temperature, if heated. The nylon solids of such formulas generally vary from 8 percent to 18 percent, although they may be both higher and lower. The nylon used in these wire enamel formulas is, as indicated previously, usually, but not always, the bright (0.02 percent titanium dioxide containing) scrap material since a bright shiny surface is desirable in these products.

In the preferred embodiment of the invention, the titanium dioxide used is a commercial pigment grade, such as, but not limited to, Titanox RA-50, from titanium division, NL Industries, or TiPure R-900, from DuPont Company. The preferred embodiment of the wire enamel is from 4 to 12 percent titanium dioxide based on the total weight of the wire enamel. This amounts to from about 20 to 40 percent of the total solids (titanium dioxide and nylon) in the wire enamel, and from 25 to 62.5 percent of the nylon solids content of the wire enamel. Ceramic grade titanium dioxide can be used, but this grade is generally of higher purity than the commercial pigment grade and has a different particle size distribution more difficult to suspend in the dispersion.

Some specific formulas for nylon enamel made in accordance with this invention are given below, but it will be understood that these are merely by way of illustration.

| titanium dioxide | 4 – 12 | 4 – 12 | 4 – 12 |
|---|---|---|---|
| "6,6" nylon fiber | 15 – 18 | 15 – 18 | 15 – 18 |
| cresylic acid | 43 – 41 | 18 – 26 | 24 – 30 |
| Solvesso 100 | 38 – 27 | 34 – 28 | — |
| xylol | — | — | 28 – 17 |
| phenol | — | 29 – 16 | 29 – 23 |
| silane | 0 – 2 | — | — |

In the above formulae, the cresylic acid, Solvesso 100, xylol and phenol are solvents for the nylon. The silane is a liquid viscosity control element.

More generally the top coat is a nylon enamel comprising nylon 6,6 fiber 15 – 18 percent, titanium dioxide 4 – 12 percent and nylon solvent 81 – 68 percent. The nylon solvent includes between 20 – 50 percent cresylic acid and from 65 – 47 percent other nylon solvents.

The preferred embodiment of the invention has been illustrated and described, but changes and modifications can be made, and some features can be used in different combinations without departing from the invention as defined in the claims.

What is claimed is:

1. The method of making insulated magnet wire having a slick, smooth surface with a low coefficient of friction suitable for winding the wire on high speed winding machines, which method comprises providing an electrical conducting wire, preparing a nylon enamel containing titanium dioxide dispersed in the enamel, the titanium dioxide being about 20 to 40 percent of the weight of the solids in the enamel and imparting a slick, smooth surface to the enamel, applying insulation around the wire to the thickness necessary for the intended service conditions and with said enamel applied as at least part of the insulation, and obtaining the slick, smooth surface by applying the insulation so as to have the nylon enamel constitute the outside surface of the insulation.

2. The method described in claim 1, characterized by applying a polymeric varnish base coat on the wire, preparing the nylon enamel from nylon scrap, by adding additional titanium dioxide to bring the dioxide content within the range of about 20 percent to 40 percent, these percentages being by weight and being percentages of the weight of nylon plus the weight of titanium dioxide in the enamel, and then applying the nylon enamel as a top coat over the base coat.

3. The method described in claim 2, characterized by applying a plastic varnish as the undercoat, and applying the nylon enamel over the undercoat to a thickness less than that of the undercoat.

4. The method described in claim 2, characterized by making the nylon enamel with scrap nylon 6,6 containing from about 200 – 300 parts per million of titanium dioxide by weight.

5. The method described in claim 2, characterized by applying as a base coat a polymeric film selected from the group consisting of polyvinyl formal, acrylic, polyurethane, polyester, and polyesterimide, and the topcoat being an enamel made from nylon, said enamel including a titanium dioxide pigment in an amount equal to from 4 – 12 percent by weight of the total enamel in the topcoat and imparting to the topcoat the slick and smooth surface.

6. The method described in claim 2, characterized by applying a base coat and a top coat that leave the wire solderable while the undercoat and top coat are on the wire.

7. The method described in claim 1, characterized by preparing the nylon enamel with the titanium dioxide constituting from 4 to 12 percent by weight of the total weight of the enamel.

8. The method described in claim 1, characterized by the nylon enamel comprising nylon 6,6 fiber 15 – 18 percent, titanium dioxide 4 – 12 percent, and solvent for the nylon 81 – 68 percent, the percentage being percentages to the total weight of the enamel.

9. The method described in claim 8, characterized by the solvent for the nylon including between 20 – 50 percent cresylic acid and from 65 – 47 percent other solvents for the nylon the percentage being percentages to the total weight of the enamel.

10. The method described in claim 1, characterized by the titanium dioxide being selected from the group consisting of commercial pigment grade titanium dioxide and ceramic grade titanium dioxide.

* * * * *